E. P. CALVIN.
DEMOUNTABLE RIM.
APPLICATION FILED JULY 25, 1916.
1,272,213.
Patented July 9, 1918.
2 SHEETS—SHEET 1.
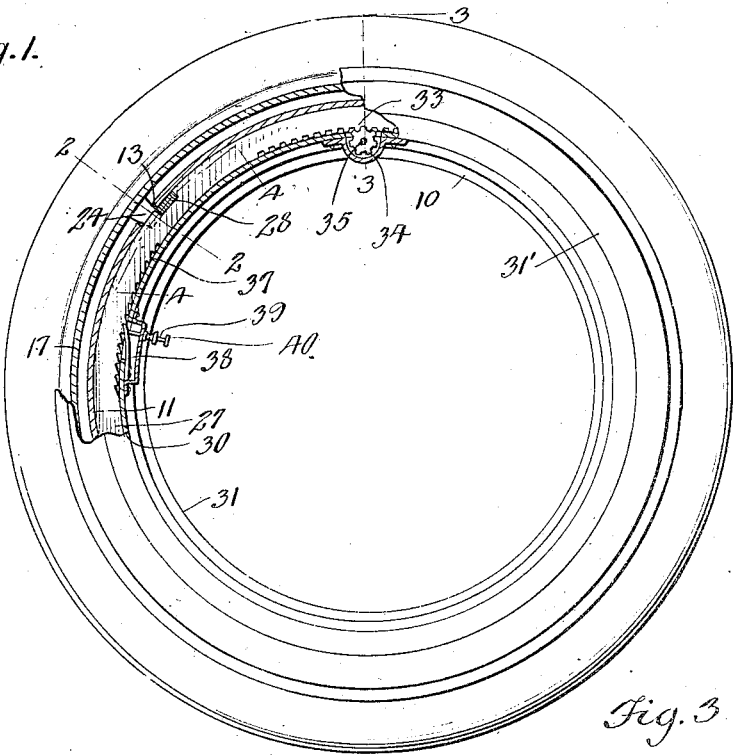
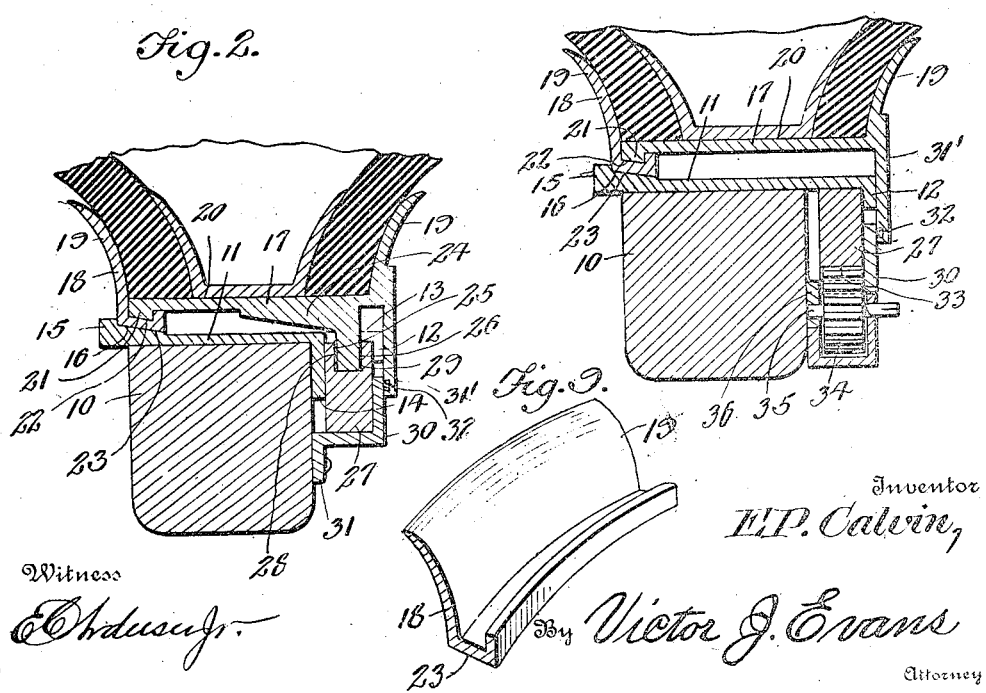
Inventor
E. P. Calvin,
By Victor J. Evans
Attorney
Witness
E. Ardusey Jr.

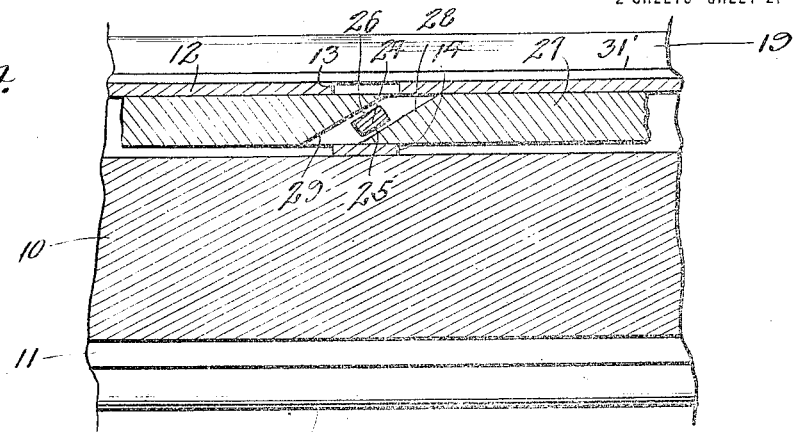
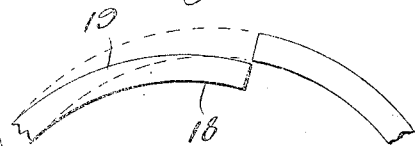
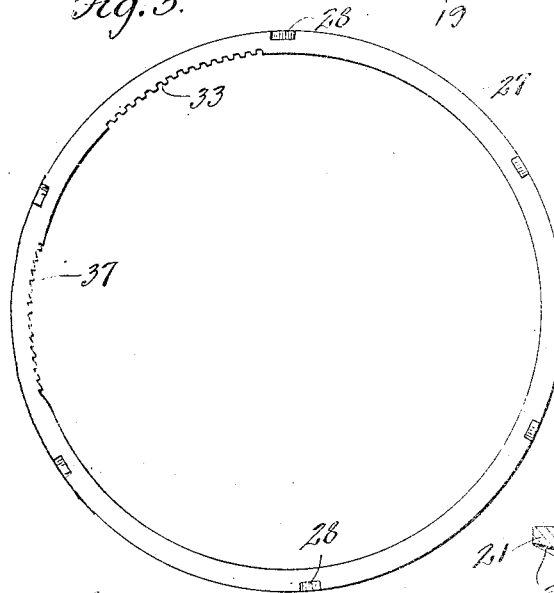
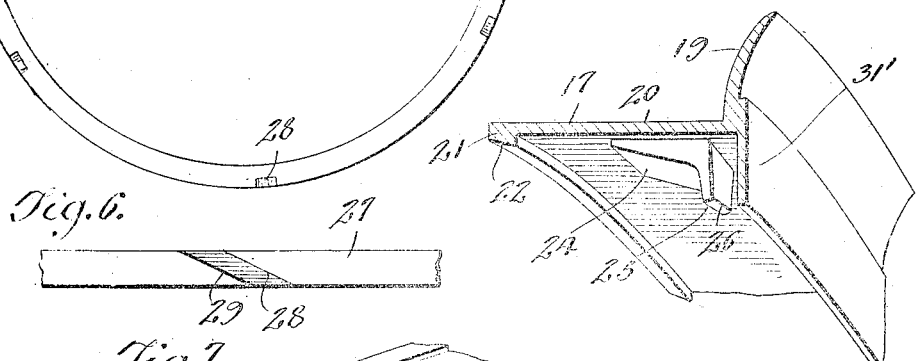
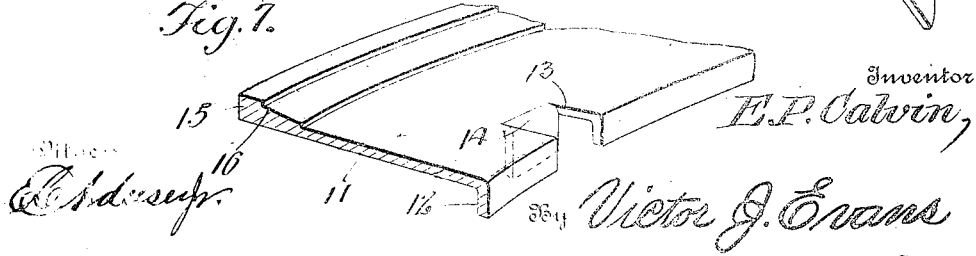

UNITED STATES PATENT OFFICE.

ELMER P. CALVIN, OF SARDINIA, OHIO.

DEMOUNTABLE RIM.

1,272,213.   Specification of Letters Patent.   Patented July 9, 1918.

Application filed July 25, 1916. Serial No. 111,236.

*To all whom it may concern:*

Be it known that I, ELMER P. CALVIN, a citizen of the United States, residing at Sardinia, in the county of Brown and State of Ohio, have invented new and useful Improvements in Demountable Rims, of which the following is a specification.

This invention relates to a demountable rim for vehicle wheels, and is particularly adaptable for engagement with the pneumatic tires of automobiles and such like vehicles, as the same is so constructed and connected with the felly of the wheel as to permit of the rim being easily and quickly released from its engagement with the said felly, to permit of the rim and the tire being moved laterally off of the said tire.

In carrying out my invention it is my primary object to provide a demountable rim for wheels whereby the tire may be easily and quickly secured thereon before the rim is applied to the felly of the wheel and whereby the said rim and tire may be easily removed from the wheel to permit of the removal of the tire from the rim, simple but novel means being employed for locking the rim upon the wheel and securing the tire to the rim.

It is also my purpose to produce a demountable rim which shall include a member that is fixed upon the felly of a wheel and a tire-carrying member or rim arranged over the fixed rim and provided with means whereby the same may be locked upon the said fixed rim and the felly of the wheel, the tire-carrying rim including two separable members having interlocking engagement with each other and one of the said members being in the nature of a side or flange for the tire-carrying rim proper and being slit and of a resilient nature whereby the ends of the same may be readily sprung into alinement to grip the tire when the said side is arranged upon the tire-carrying rim proper, and also whereby the ends of the said side may be moved one away from the other to disconnect the side from the tire-carrying rim proper and to permit of the ready removal of the said tire from the rim.

It is still a further object of the invention to simplify and improve the construction of demountable rims forming the subject matter of United States Patent Application No. 24,309, said application having been allowed on December 31, 1913.

With the above and other objects in view the improvement resides in the construction, combination and arrangement of parts set forth in the following specification and falling within the scope of the appended claim.

In the drawings:

Figure 1 is a side elevation, partly in section, showing a wheel felly, the relation of the fixed and detachable rims thereto, the locking ring and the operating means for the latter, Fig. 2 is an enlarged cross sectional view approximately on the line 2—2 of Fig. 1, Fig. 3 is a similar sectional view approximately on the line 3—3 of Fig. 1, Fig. 4 is a longitudinal or circumferential section approximately on the line 4—4 of Fig. 1, looking from the wheel hub outwardly, Fig. 5 is a fragmentary perspective view of the locking ring, Fig. 6 is a plan view of the same, Fig. 7 is a fragmentary perspective view of the fixed rim, Fig. 8 is a similar view of the main member of the demountable rim, and Fig. 9 is a similar view of the detachable or side member of the demountable rim.

Fig. 10 is a detail side elevation of the side section showing the ends thereof sprung apart.

In the drawings like reference characters designate corresponding parts throughout the several views.

Referring now to the drawings in detail, 10 designates a wheel felly, and 11 a fixed rim, composed of metal, surrounding the felly 10 and fixed thereto as well as projecting beyond both of the sides of the felly. The fixed rim 11 is extended beyond one of the sides of the felly a greater distance than the same is extended beyond the opposite side of the said felly, and the said rim, at its edge projected over the first mentioned side of the felly, is provided with inwardly extending flange 12 and the said rim from the said edge at intervals is formed with notches 13, the felly being provided with inwardly extending plates or ears 14 arranged in a line with the inner walls of the notches 13 and these ears contact with one of the sides of the wheel felly 10 and may, if desired, be secured to the said felly. Along its opposite edge the rim 11 is provided with outwardly extending annular flange 15 and the rim 11 is thickened at its surface adjacent the said flange 15, providing the outer face of the said rim with a beveled or wedge-shaped surface 16 for a suitable distance from the said flange 15.

The tire-carrying rim includes two sections, a main section 17 and an auxiliary or side section 18. Both of these sections are provided at one of their sides with the usual flanges 19. The main section 17 includes a flat annular base 20 having its inner edge, or its edge opposite to that provided with the flange 19, formed with an inwardly extending annular tongue 21, while the auxiliary or side section has its base in the nature of a channel member, as indicated by the numeral 22 and this channel is adapted to receive the tongue 21. The inner face of the base or channeled portion of the section 17 is beveled or wedge-shaped, as at 23, and this portion of the said member 18 is adapted to be received upon the beveled surface 16 of the fixed rim 11, while the outer surface of the said section 18 is adapted to be contacted by the annular flange 15 of the said fixed rim. The rim section 18 comprises an annular element which is slitted angularly and which is constructed of some suitable spring material whereby, when the ends of the same are brought into alinement, and the channeled portion thereof engages with the tongue of the main section 17, the section 18 will grip the section 17 and normally sustain itself in proper position thereon with its meeting edges alining. It will be apparent that the section 18 may be readily removed from the section 17 when the tire-carrying rim is moved laterally off from the fixed rim (in a manner which will presently be described), by bringing one of the split ends out of register with the other end of the said section 18 and by then moving the ends of the section one over the other, so that one of the ends will lap the other end of the said section 18.

The main section 17 of the tire-carrying rim has its inner face provided with inwardly extending lugs 24, the said lugs having oppositely inclined wedging faces 25 and 26 and the number of these lugs correspond with the number of notches 13 in the fixed rim 11, one of the said lugs being adapted to be received each in one of the said notches so that the inclined or wedging faces of said lugs are disposed approximately centrally of the passage provided between the flange 12 and the ears 14 of the said fixed rim 11.

The locking ring is indicated by the numeral 27 and is adapted to be received within the referred to passage between the flange 12 and the ears 14 of the fixed rim and so to be positioned adjacent to one of the sides of the felly 10. The locking ring 27 has its outer periphery or face notched at spaced intervals, the number of notches corresponding with the number of lugs 24 and the said notches are cut at an angle providing the locking ring with oppositely disposed pairs of wedging faces 28 and 29. The wedging faces of the locking ring are adapted to co-act with the inclined or wedging faces of the lugs 24 so that when the ring is partly revolved in one direction, around the wheel felly, the wedging faces 28 of the locking ring will engage with the wedging faces 25 of the lugs to move the tire-carrying rim laterally of the felly in an outward direction, and when the ring 27 is moved in an opposite direction, the wedging faces 29 of the said locking ring will contact with the wedging faces 26 of the lugs moving the tire-carrying rim over the wheel felly and the beveled surfaces of the base of the tire-carrying rim section over the beveled surface 16 of the fixed rim and forcing the said section 18 into contact with the annular flange 15 of the said fixed rim and so properly retain the tire-carrying rim upon the wheel felly.

The locking ring is inclosed in an angular channeled member 30 having its base portion provided with an inturned annular flange 31 which is provided with suitable openings through which pass securing elements whereby the channeled housing member 30 is secured to one of the sides of the wheel felly 10. The outer edge of the channeled housing member 30 may contact with the inner edge of the flange 12 of the fixed rim 11, and the member 17 of the tire-carrying rim may have an inwardly extending flange 31 which is in the nature of a flat disk or ring or the said ring member 31 may be secured to the flange 19 of the said member 17, the member 31 bridging the joint between the channeled housing 30 and the flange 15 of the fixed rim 11, thus protecting the structure from dirt or other foreign matter, and furthermore, if desired, the ring member 31 upon its inner face may be provided with an annular depression to receive a packing ring 32 which will more effectively insure a tight joint between the said ring 31 and the housing 30.

The means for partially turning the locking ring 27 embodies a rack face 33 on the said ring and in conjunction therewith a pinion 34 fastened on a pinion shaft 35, said shaft having its inner end journaled in a suitable bearing plate 36 which may be provided by the inner wall of the housing 30 and which if desired may be a member separable from the housing, while the outer end of the shaft projects through an opening in the outer face of the housing 30, the last mentioned end of the shaft being square in cross section to receive a suitable key by means of which the shaft and pinion may be turned in order to impart a corresponding movement to the locking or wedging ring. In order to prevent any possibility of the detachable rim and locking ring working loose, the ring 27 is provided with ratchet teeth 37 which are engaged by a spring detent 38 that has attached thereto a stem 39 that projects through an opening in the housing 30, and the end of the said stem is provided with an operating head 40. The spring detent is, of course, brought out of engagement with the ratchet teeth before the pinion is operated to turn the locking ring, and from the foregoing description when taken in connection with the drawings the construction, operation and advantages of the device will, it is thought, be apparent to those skilled in the art to which such invention appertains without further detailed description.

Having thus described the invention, what I claim is:

The combination with the felly of a vehicle wheel, of a fixed rim fastened thereon and projecting over the sides of the said felly, one of the edges of the said rim having an inturned annular flange, said edge being provided with spaced notches, ears upon the inner walls of the notches contacting and secured to one of the sides of the felly, the opposite edge of the rim having an outturned flange and having its outer face from the said flange beveled, a detachable tire-carrying rim surrounding the fixed rim, lugs upon the underface of the said tire carrying rim having oppositely wedge-shaped faces which are arranged one within each of the notches of the fixed rim, a turnable member having spaced wedge-shaped faces co-acting with the lugs, a housing for the said turnable member secured to the side of the felly, means carried by said housing and co-acting with the turnable member for moving the same, means carried by the said housing for locking the turnable member, and an inturned flange upon the tire-carrying rim having its inner face provided with a compressible element which contacts with the outer face of the housing.

In testimony whereof I affix my signature.

ELMER P. CALVIN.